Dec. 8, 1959 — M. F. PETERS — 2,916,307
VIBRATION DAMPER FOR FLUID PRESSURE SEAL
Filed May 3, 1955
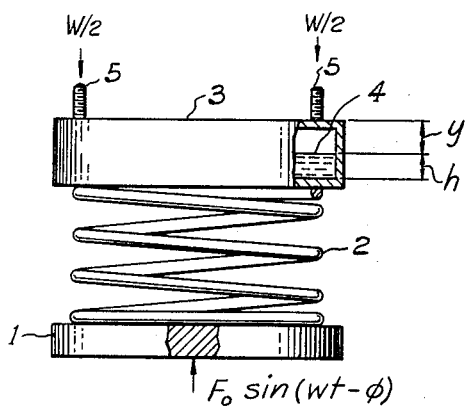
Fig.1.
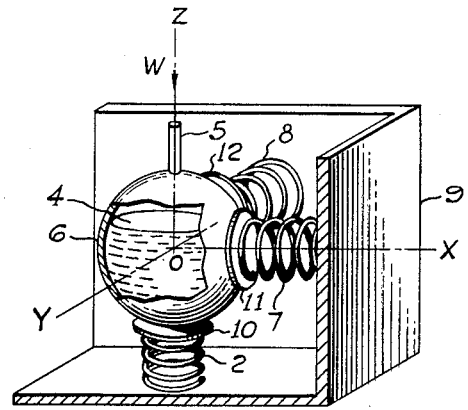
Fig.2.
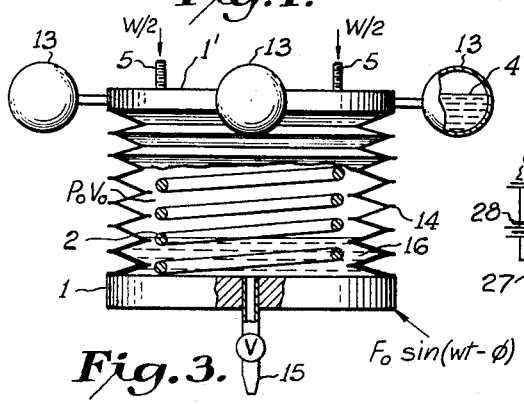
Fig.3.
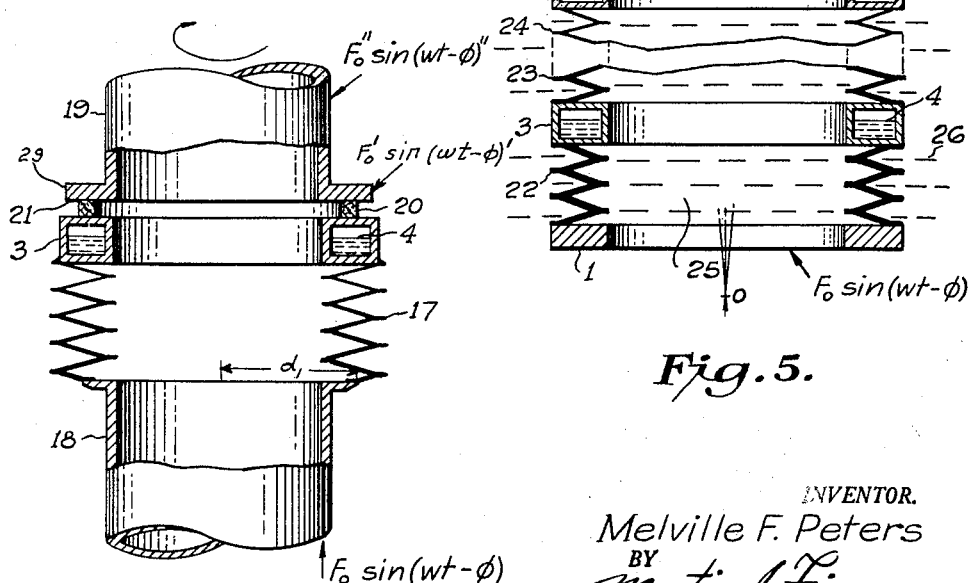
Fig.4.
Fig.5.
INVENTOR.
Melville F. Peters
BY
Martin J. Finnegan
ATTORNEY United States Patent Office 2,916,307
Patented Dec. 8, 1959

2,916,307
VIBRATION DAMPER FOR FLUID PRESSURE SEAL

Melville F. Peters, Livingston, N.J.

Application May 3, 1955, Serial No. 505,810

2 Claims. (Cl. 285—9)

This invention relates to devices used for damping the vibrations induced in flexible fluid seals and in particular to flexible seals which are used in equipment or apparatus which are subjected to shaking forces.

Flexible fluid seals in the form of bellows are used in expansion joints, valves, control apparatus, rotary seals and many other installations where either the passage of the fluid through the seal initiates vibration, or the supports for the seal are subjected to shaking forces. Tests have shown that when the frequency of the shaking forces are equal to, or approach the resonant frequency of the bellows, the amplitude of the vibrating parts can become great enough to cause failure in a matter of seconds. Since the bellows is the equivalent of a piston which forms a hermetical seal with a cylinder and executes a reciprocating motion without friction, the use of a damping element with a bellows which relies upon the rubbing of surfaces, would be impractical at high temperatures, or in apparatus where the bellows is used in control circuits, or in rotary seals operating at high speeds. This limits the damping units to types which use a fluid, or an electro static or magnetic field, or a mechanism relying upon impact to absorb and dissipate the kinetic energy from the bellows.

When a bellows is subjected to shaking forces which are gradually increased in frequency, it will be found that when the frequencies are below the frequency; of the first harmonic, the bellows will vibrate as a complete unit and the amplitude of the vibrating bellows will be relatively small. As the frequency of the shaking force approaches the resonant frequency of the bellows, the amplitude of the vibrating bellows will increase and unless a damping mechanism is used, or the frequency of the shaking force changed, the amplitude will become so great at the resonant frequency of the bellows that it will fail.

If the frequency of the shaking forces have been increased before the bellows fails, the amplitude of vibration will remain small until the frequency of the forces are in the neighborhood of the frequency of the second harmonic. Within this band of frequencies the bellows will separate into two equal sections and each section will vibrate as a separate mass suspended by a separate spring, and unless the frequency is quickly changed when the shaking force reaches the resonant frequency of the bellows, the amplitude of the two vibrating sections of the bellows will become great enough to cause failure.

If the frequency of the shaking forces are again increased before the bellows fails, the amplitude of vibration will remain small until the frequency of the force approaches the third harmonic. Within this neighborhood of frequencies the bellows will divide into three sections and each section will vibrate as a separate mass, suspended by separate springs with equal spring rates and unless the frequency is quickly changed after the shaking forces reach the resonant frequency of the bellows, the amplitude of the three vibrating bellows units will become great enough to cause failure. In this manner over a wide range of frequencies there will be found that with each increase in frequency of the shaking forces, there will be a band of frequencies which will cause the bellows to separate into parts and to vibrate as separate masses suspended by separate springs and to fail in a relatively short time if the shaking forces are continued at the resonant frequency of the divided bellows. In most installations the bellows can be sufficiently damped by applying three selective damping units to the bellows assembly, since the accembly is seldom operated at frequencies above the third harmonic.

When the bellows consists of only one or two convolutions the natural frequency of such a short bellows will be very high and consequently the frequency of the shaking forces must be very high to reach the resonant frequency of the bellows. As convolutions are added however, the fundamental frequency decreases, until with long bellows the resonant frequency of the bellows may be so low that the bellows will divide into two or more sections when used in a system subjected to shaking forces greater than the fundamental frequency of the bellows. Since each section of the divided bellows vibrate as a separate mass, the complete damping of the bellows will require a damping unit on each of the separate parts.

The decay of amplitude in a vibrating system is due to the dissipation of energy and the dissipation of the energy by the damping force will depend upon both the magnitude of the force and its phase relation with respect to the vibrating bellows. This means that if a plate of mass $m_1$ is moving in one direction with velocity V and strikes a second body of mass $m_1$ consisting of a powdered material moving in the opposite direction with a velocity V, that after impact the two bodies will be at rest, providing the powdered material can dissipate the energy in the two masses by rubbing together. This is dissipation of energy by impact and the energy dissipated at impact is known to be a maximum when the phase displacement between the direction in which the plate is moving and the direction in which the powdered material is moving is 180 degrees. The present invention accomplishes this dissipation of energy in a bellows assembly by utilizing a container partially filled with a liquid or powdered material attached to some part of the assembly. For best results the frictional forces between the side walls of the container and the particles of material should be made negligible, since the very nature of these frictional forces prevents the particles of material from reaching the maximum velocity V of the container, and consequently the change in momentum of the particles can never reach $2m_1V$ by impact with the container. While these frictional forces acting between the side walls and particles can never be eliminated, they can be made very small by using a container having a relatively small polished area exposed to the particle. Due to the abrasive action of the material, the particles will be ground to a powder and the powder will therefore constitute means for maintaining the walls of the container in a highly polished condition, so that polishing of such walls or controlling the size of the particles before installation in the system is not required.

Experiments have shown that the energy absorbed by a compartment mounted on a vibrating test machine will increase with an increase in the amount of powder or liquid introduced into the compartment until a maximum value is reached, after which an additional amount of material will reduce the energy absorbed by the material. These experimental results are supported by theory, since the greatest change in momentum will take place when the liquid, or powder, or both liquid and powder moving at velocity V in one direction, is timed to meet some portion of the compartment moving at maximum velocity V in the opposite direction. To satisfy this condition it is necessary to have a definite relation between the free space and the space occupied by the loose material in the compartment. This relation will depend upon the density of the material and the size, shape, permeability and the coefficient of friction between the particles when a solid material is used and the viscosity when the material is in the form of a liquid. In practice, this relation can be determined experimentally by selecting a quantity of material and increasing the distance between the capped ends until the amplitude of vibration is reduced to $X_0$, or by adding the liquid or powder to a compartment until the amplitude is reduced to $X_0$. Under these conditions the liquid or particles of material which are tossed around in the compartment will not be acted on by the restoring force for more than a fractional part of each cycle and consequently the system behaves as an assembly with a mass which changes abruptly during each cycle of vibration.

These experimental results can be verified by showing that the change in momentum of a particle with a mass $\Delta m_p$, volume $\Delta U_p$, vibration with a frequency of $f = w/2\pi$ and an amplitude $X_0$, will be $2\Delta m_p \cdot w \cdot X_0$, when the distance between the walls of the compartment along the axis of vibration is $\pi X_0$.

It is therefore a first object of the invention to provide a novel method of vibration absorption, involving the step of partially filling a compartment of a bellows assembly with a liquid, a powder, or solid particles of any convenient shape and size, so that when the assembly is vibrated the compartment and material will undergo changes in momentum.

A second object of the invention is to provide a method including the step of partially filling a compartment with a liquid or powder whose acceleration, in response to vibrating forces, will consume energy which will be dissipated in the form of heat.

A third object of the invention is to provide a method including the step of partially filling a compartment, having a spring in combination therewith, with a fluid or granular material so that the effective mass of the compartment will be variable during a cycle of vibration.

When a spring acts alone on a mass, the restoring force will be proportional to the spring rate $K_1$ of the spring. When the spring is combined with a bellows having a spring rate $K_2$, the restoring force will be proportional to $K_1$ plus $K_2$ and when the assembly consists of the spring, and a bellows containing a gas at a pressure $P_0$, the restoring forces of the assembly will be proportional to $K_1$ plus $K_2$ plus the force exerted by the gases confined in the bellows. It is therefore a fourth object of the invention to control the spring rate of a bellows assembly by controlling the pressure of the fluids in the compartment formed by hermetically sealing the two ends of the bellows to the assembly.

The loss of energy between the rubbing particles is proportional to the coefficient of friction between the particles and the forces pressing the particles together. The coefficient of friction can be increased by out gassing or evacuating the compartment and solid material and the force pressing the particles together can be increased by using magnetized ferro magnetic particles. When the particles are conductors of electricity the forces acting between the particles can be increased by using a magnetic field to induce a current in the vibrating particles. These currents flowing in the particles will produce a magnetic field which will draw the particles together and consequently increase the frictional forces between them. When the magnetic field does not vibrate with the compartment, the electro magnetic forces developed between the magnetic field and the induced field in the vibrating assembly can be used to dampen the compartment assembly.

A fifth object is to provide a method including the step of partially filling one or more compartments in a bellows assembly with magnetized ferro magnetic powder or particles, or in combination with a liquid, so that the magnetized particles will rub together and dissipate energy when the assembly is subjected to shaking forces.

A sixth object is to provide a method including the step of applying a magnetic field to limit the movement of the material within such compartment or compartments, so that the magnetized particles will rub together and dissipate energy when the assembly is moving in the magnetic field.

A seventh object is to provide a method including the step of evacuating the compartment or compartments, to increase the frictional losses between the particles when the compartment is evacuated.

A fluid tight seal can be formed between a fixed and rotating conduit by pressing a ring which is attached to the fixed conduit against a plate which is attached to the rotating conduit. To obtain a tight seal it is necessary to hold the ring against the plate at a constant pressure and to prevent the ring from bouncing on the plate it is necessary to isolate the ring and plate from the shaking forces. To equalize the stresses in the bellows, the bellows plates are made thicker on the end or ends which are in contact with the shaking conduits and the thickness of the plates progressively decreased from one end of the bellows to the other end, or the plate thickness progressively decreased from the two ends of the bellows to the center. An eighth object of the invention is to secure one end of a compartment which is partially filled with liquid, powder or granular material to one end of a ring which forms part of a rotary seal and to secure the other end of the compartment to the free end of a bellows and to secure the other end of the bellows to a fixed conduit, so that at least a portion of the energy transmitted to the compartment by the bellows will be dissipated before it reaches the sealing ring by the contents of the compartment. A ninth object of the invention is to secure one end of a compartment which is partially filled with liquid, or granular material, or both, to one end of a sealing ring of a rotary seal and to secure the other end of the compartment to a bellows which is attached to a conduit and to secure one end of a compartment which is partially filled with a liquid or granular particles to a plate which forms a rotary seal with the ring and to connect the other end of the compartment to one end of a bellows which is attached to a second conduit, so that at least a portion of the energy transmitted to one or both compartments by one or both bellows will be dissipated before it reaches the sealing surface of the contents in the compartment. It is a tenth object of the invention to secure one end of a compartment which is partially filled with liquid, powder, or granular material to one end of a carbon or ceramic ring which forms part of a rotary seal and to connect the free end of the compartment to a conduit with a bellows having membranes at one or both ends which either progressively decrease in stiffness from the end of the bellows attached to the conduit when the shaking forces arise in the conduit, or progressively decrease in stiffness from the end of the bellows attached to the compartment when the shaking forces arise in the rotating plate which mates with the ring to form a seal, or progressively decrease in stiffness from the two ends to the central section of the bellows when the shaking forces arise in the conduit and the rotating plate, so that at least a portion of the energy transmitted to the compartment or compartments will be dissipated by the liquid or powder in the compartments.

When the bellows assembly is to be used in a valve or expansion chamber where the compartment is submerged in a liquid, the free space in the compartment can be made large enough to make the weight of the bellows assembly equal to the weight of liquid displaced by the assembly. This will allow a long heavy bellows to be operated in a vertical position without over stretching the top convolutions or to take the shape of a caternary when suspended by the ends in a horizontal position.

When the bellows assembly is heavy, partitions may be placed in the chamber, so that the correct buoyancy of the assembly may be obtained without modifying the space allowed for the liquid or powder. Most bellows installations have end plates to hold the assembly in place and consequently the fluid will seldom be required to support more than a fractional part of the weight of the assembly. When the weight of the assembly is less than the weight of the displaced fluid, sinkers can be added to the assembly to make the weight of the sinkers and the liquid supported portion of the assembly, equal to the weight of liquid which is displaced by the portion of the assembly supported by the liquid.

It is therefore an eleventh object of the invention to form a fluid seal by using a plurality of compartments held together and to end fittings by bellows and to partially fill the compartments with a liquid or particles of material so that when the assembly is subjected to shaking forces, a portion of the energy transmitted to the compartments will be dissipated by the material in the compartments. It is a twelfth object of the invention to form a fluid seal by using a plurality of compartments held together and to end fittings by bellows which progressively decrease in the ratio of their spring constant K to their mass $m$ from the ends of the fittings to the center of the bellows assembly and to partially fill the compartments with a liquid, powder, or loose material which will dissipate energy when vibrated. It is a thirteenth object of the invention to make the weight of a bellows assembly which is at least partly immersed in a liquid, equal to the weight of liquid it displaces by adjusting the free space in the compartments which are part of the assembly, or by adding floats to the assembly. It is a fourteenth object of the invention to make the weight of a bellows assembly which is completely immersed in a liquid equal to the weight of liquid it displaces by adding floats to the system, or by adjusting the free space in the compartments which are partially filled with liquid, or powder and are part of the assembly. It is a fifteenth object of the invention to form a fluid seal by securing a plurality of compartments together and to end fittings with bellows and to adjust the volume of the compartments so that the liquid or particles or material which partially fill the compartments will produce damping and by means of partitions or walls in the compartments, or by adding floats to the assembly, make the portion of the weight of the bellows assembly which is supported by the liquid, equal to the weight of liquid which is displaced by the portion of the assembly supported by the liquid. It is a sixteenth object of the invention to form a fluid seal by securing a plurality of compartments together and to end fittings with bellows and to adjust the volume of the compartments so that the liquid or particles of material which partially fill the compartments will produce damping and by adding sinkers to the assembly, make the portion of the weight of the bellows assembly which is supported by the liquid, equal to the weight of liquid which is displaced by the portion of the assembly supported by the liquid.

It is a seventeenth object of the invention to partially fill one or more compartments in a bellows assembly with liquid metals such as gallium, mercury, liquid bismuth, or with liquids having a high viscosity. It is an eighteenth object of the invention to partially fill one or more compartments with a heavy element or compound in the solid state, such as tungsten powder, tungsten oxides, lead powder, lead oxide and so forth, or with these solid particles mixed with a liquid.

In the drawing:

Figure 1 is a cross sectional view of a base which can be actuated by a shaking force $F_0 \sin (wt-\phi)$ supporting one end of a spring which has the other end attached to a compartment which is partially filled with a liquid, powder or particles of material, together with studs for holding a unit sensitive to vibration, an embodiment of the invention.

Figure 2 is a cross sectional view of a supporting structure actuated by a shaking force $F_0 \sin (wt-\phi)$ holding one end of each of the three springs at right angles to each other and the free ends of these three springs are attached to a spherically shaped compartment which is partially filled with liquid or loose material, together with a stud for supporting units which are sensitive to vibration, an embodiment of the invention.

Figure 3 is a cross sectional view of a supporting structure actuated by a shaking force $F_0 \sin (wt-\phi)$ holding one end of a spring and one end of a bellows which have thicker plates on the ends than in the center and having the free ends of the spring and bellows attached to a disk which rigidly supports a plurality of chambers partially filled with liquid or powder and a fluid valve in the supporting structure to control the quantity of fluid or powder in the bellows chamber, an embodiment of the invention.

Figure 4 is a cross sectional view of two conduits, one or both of which can be actuated by a shaking force, a rotary seal assembly between the two conduits which consists of a bellows, a compartment partially filled with a liquid or loose material, a sealing ring and a rotating plate, an embodiment of the invention.

Figure 5 is a cross sectional view of two end fittings subjected to a rolling motion and to a shaking force, secured to a combination of bellows and compartments which have bellows with membranes which decrease in thickness from the end bellows to the bellows in the center of the assembly and compartments partially filled with a liquid or loose material with sufficient free space in the compartment to support the bellows assembly in the fluid and a magnetic field in the neighborhood of one or more of the unfilled compartments, an embodiment of the invention.

In Figure 1 a shaking force $F_0 \sin (wt-\theta)$ is applied to 1 which supports one end of spring 2 and the other end of 2 is fastened to compartment 3 which is filled to a depth $h$ with a material 4, which is either a liquid, a powder, or particles of solid material which can conform to the shape of the compartment when tossed back and forth and a free space between the surface of the material and the compartment equal to $y$, where $h$ and $y$ are determined by adding small amounts of material 4 to the chamber until the amplitude of the vibrating membranes have been reduced to a minimum value, or by putting a quantity of material into the compartment and changing the height $y$ of the free space until the amplitude of vibration of the membranes is a minimum. When all the gases are removed from compartment 3 and the particles or material 4, the frictional losses between the rubbing particles will be increased. When 4 is a magnetic material the pressure between the particles will be increased by the magnetic attraction between the particles and this will further increase the frictional losses and when a liquid is used in combination with the solid material the damping will take place by the motion and the relative motions of the particles and liquids. The studs 5 are used for attaching the equipment W/2 which is sensitive to vibration.

The dissipation of energy by the material can be made independent of the angles formed between the shaking force $F_0 \sin (wt-\theta)$ and the coordinate axis $x, y, z$ by making the compartment 6 spherical and supporting it on the three springs 2, 7, 8 as shown in Figure 2. The compartment is partially filled with a liquid or powder 4 and one end of each of the three springs which are arranged to act along one of the coordinate axis is fastened to 9 and their free ends fastened to the three plates 10, 11, 12 respectively which are fastened to 6.

In Figure 3, the shaking force $F_0 \sin (wt-\theta)$ acts on 1 which is used to support one end of bellows 14 and spring 2 and the other ends of the bellows and spring are fastened to the disk 1' which supports a plurality of capsules 13 which are partially filled with a liquid, a powder, or particles of solid material 4. For best results the end plates of bellows 14 should be heavier than the other plates and the thickness of these plates are progressively decreased from the ends to the center of the bellows. The load which is attached to studs 5 is supported by bellows 14, the spring 2, the gases at pressure $P_0$, or by any combination of these three supporting units. When the spring rate or constant of the bellows is $K_1$ and the spring constant of the spring $K_2$, the spring constant of the combination is $K_1 + K_2$ and when the vapor pressure is $P_0$ and the volume of the bellows compartment $V_0$, the spring rate of the inclosed gases will be the equivalent of a spring rate of $K_3$ for displacements of 1', so that the spring constant of all three acting together will be $$K_1 + K_2 + K_3 = K$$

The valve V at 15 is used to control the volume of liquid or powder 16 in the bellows chamber, so that the spring constant $K_3$ can be modified to control the natural frequency of vibration of the bellows assembly by controlling the volume $V_0$, which may be done manually or automatically, or V may remain open and serve as an expansion chamber. Damping will also take place when the material 16 is tossed around in 14 and for the same reason damping will take place when 4 is tossed around in 13.

In Figure 4 the shaking force $F_0 \sin (wt-\theta)$ is transmitted from conduit 18 to the sealing surface 21 through bellows 17, the compartment 3 which is partially filled with a liquid or powder 4 and the sealing ring 20. The shaking force $F_0' \sin (wt-\theta)'$ is developed by the rotating plate 29 and the shaking force $F_0'' \sin (wt-\theta)''$ is transmitted from conduit 19 to the sealing surface 21 through plate 29. When $F' \sin (wt-\theta)'$ and $F'' \sin (wt-\theta)''$ are both negligible, the life of the bellows can be increased by progressively decreasing the thickness of the membranes of 17 from the end secured to 18 to the end secured to 4. The assembly 17, 4 and 20 is made approximately independent of the ambient pressure by connecting 17 to 18 at its center of pressure and making the average diameter of 20 equal to $d_1$. For most efficient operation the time constant of the bellows should be small compared to the frequency of the shaking forces. When the bellows is set in vibration by the shaking force $F_0 \sin (wt-\theta)$ acting on 18, the compartment and fluid 3 and 4 reduces the amplitude of the vibrating parts so that 20 does not bounce on 19 and an effective seal is formed between 20 and 29 at 21. When the shaking force $F_0 \sin (wt-\theta)$ is negligible and the shaking force $F_0' \sin (wt-\theta)'$ becomes very great, the bellows 17 should be turned around, the thick membrane is secured to 3 and the thin membranes secured to 18 and when both shaking forces $F_0 \sin (wt-\theta)$ and $F_0' \sin (wt-\theta)'$ are great, the bellows 17 should have the thickest membranes on the two ends and the thinnest membranes in the center section, and the thickness of the remaining plates should be progressively reduced in thickness from the two ends to the center section. When the shaking forces $F_0'' \sin (wt-\theta)''$ are too great to be neglected, a bellows compartment similar to 17 and 4 is placed between 19 and 29.

In Figure 5 a shaking force $F_0 \sin (wt-\theta)$ can be transmitted to either one or both ends of the bellows assembly 1 and 1' while the bellows assembly rolls through an angle $\pm \theta$. The assembly consists of bellows 22 which has one end attached to 1 and the other end connected to compartment 3 which is filled with liquid or powder. The free end of 3 is attached to bellows 23 which in turn has its free end connected to a second compartment. In this manner compartments partially filled with liquid or powder are spaced between sections of bellows until the end bellows $n$, is connected to end plate 1'. Since bellows 22 and $n$ must transmit the forces which accelerate all the other bellows sections and compartments, the membranes of these two bellows should be thicker than the membranes in all the other bellows of the assembly and for the same reason the membranes of 23 and $n-1$ should be thicker than the membranes of the bellows sections in the assembly which are capped by these two bellows. Proceeding in this way the membranes in each bellows section of the assembly between 23 and $n-1$ will continue to be reduced in thickness until the bellows in the central part of the assembly is reached. The same results can be obtained by progressively decreasing the height of the convolutions of the bellows sections from the end plates 1, 1' to the central bellows, or by progressively decreasing the stiffness of the plates by changing the curvature, or the modulus of elasticity of the plates, or stated more explicitly, the ratio between the spring rate K to the mass $m$ of each bellows section should be greatest in the two end assemblies which are fastened to the end plates 1, 1' and this ratio should decrease with each section until the center bellows section or sections is reached. When the assembly is used as a seal in a valve, or as an expansion chamber in a ship, an airplane, or other form of carrier, and the bellows is partly submerged in a liquid, the free space in each compartment should be adjusted so that the weight of each compartment, plus the weight of the particles and liquid in each compartment, plus the weight of bellows supported by each compartment, is equal to some predetermined portion of the weight of liquid displaced by the assembly and when the bellows assembly is completely submerged in a liquid, the free space in all the compartments should be adjusted so that the weight of the bellows assembly, less the weight supported by the two end plates, shall for all practical purposes be equal to the weight of the displaced liquid. When these adjustments have been made for the bellows in the vertical position, the assembly can be rolled through a small angle of $\pm \theta$ without distorting the bellows, since the component parts of the submerged bellows will be in equilibrium with its supporting fluid. When $\theta$ is large the supporting forces between 1, 1' and the bellows assembly will experience a small displacement, but for all practical purposes there will be very little distortion of the bellows even through $\pm \theta$ approaches $\pm \pi/2$. When the bellows is to be used in the horizontal position, which is the position where $\theta = \pm \pi/2$, the bellows assembly can be adjusted in this position so that the weight of the assembly supported by the fluid, is equal to the weight of displaced fluid. The determination of the free space will take into consideration the fluid acting at 25, the fluid acting at 26 and the two fluids acting together at 25, 26.

When the particles are magnetized by coil 27 which is grounded at $G_1$ and receiving electrical energy from battery 28 which is grounded at $G_2$, the flux acting on 4 will be greatest for the same coil when the walls of the compartments are made of non ferro magnetic material. If a mixture of ferro magnetic material and oil is used, the action will consist of the oil flowing and dragging the particles away from the field and the field in turn dragging the particles back, so that the relative velocity between the moving particles and liquid will be increased and consequently the damping will be increased. In many installations permanent magnets can be substituted for the electromagnets.

If the free space in the compartments which is required for the optimum damping of the shaking assembly, does not produce a volume of the assembly great enough to make the weight of the unsupported portion of the assembly equal to the weight of the displaced liquid, partitions can be placed in the compartments to increase the volume of voids without changing the free space in the compartments occupied by material 4, or by adding floats and if an unsupported portion of the assembly has less weight than the displaced liquid, material with a density greater than liquid 25 or 26 can be added to the assembly.

When the shaking forces $F_0 \sin (wt-\theta)$ are negligible and the mass of the bellows is great enough to cause the center of the bellows to distort when rolled through an angle of ±θ, the assembly can be balanced in the liquid and the compartments reduced in size by eliminating material 4 from the compartments, or substituting a solid float for 3 having a density less than the density of the supporting fluid.

What I claim is:

1. A flexible, vibration absorbing fluid seal comprising, a series of bellows of progressively varying wall thickness, a ring-shaped hollow compartment secured between adjacent bellows, a quantity of material partially filling each of said compartments, said material being capable of freely conforming to the shape of the compartment and means to secure the seal to a fluid line.

2. A flexible, vibration absorbing fluid seal comprising a series of bellows, a ring-shaped hollow compartment secured between adjacent bellows, a quantity of ferrous material partially filling each of said compartments, said material being capable of freely conforming to the shape of the compartment, a magnet adjacent each of the compartments and means to secure the seal to a fluid line.

References Cited in the file of this patent

UNITED STATES PATENTS

| | | |
|---|---|---|
| 1,833,319 | Damsel | Nov. 24, 1931 |
| 1,902,787 | Dusenberg | Mar. 21, 1933 |
| 1,995,620 | Monroe | Mar. 26, 1935 |
| 2,302,670 | Buchanan | Nov. 24, 1942 |
| 2,305,809 | Maisch | Dec. 22, 1942 |
| 2,333,401 | Woods | Nov. 2, 1943 |
| 2,402,224 | Hornbostel | June 18, 1946 |
| 2,417,347 | Brown | Mar. 11, 1947 |
| 2,434,794 | Giesler | Jan. 20, 1948 |
| 2,469,167 | Little | May 3, 1949 |
| 2,473,618 | Stillwagon | June 21, 1949 |
| 2,657,074 | Schwester et al. | Oct. 27, 1953 |

FOREIGN PATENTS

| | | |
|---|---|---|
| 250,561 | Italy | Oct. 21, 1926 |
| 337,398 | Italy | Mar. 4, 1936 |